US005796838A

United States Patent [19]

Heerman

[11] Patent Number: 5,796,838

[45] Date of Patent: Aug. 18, 1998

[54] METHOD AND APPARATUS FOR PERFORMING FREQUENCY SPECTRUM INVERSION

[75] Inventor: Douglas A. Heerman, Raymond, Nebr.

[73] Assignee: Transcrypt International, Inc., Lincoln, Nebr.

[21] Appl. No.: 691,600

[22] Filed: Aug. 2, 1996

[51] Int. Cl.$^{6}$ .............................. H04K 1/00; H04L 9/00

[52] U.S. Cl. .............................. 380/38; 380/19; 380/39; 380/49

[58] Field of Search .............................. 380/19, 38, 39, 380/49

[56] References Cited

U.S. PATENT DOCUMENTS

| | | | |
|---|---|---|---|
| 3,777,964 | 12/1973 | Allen et al. . | |
| 4,908,860 | 3/1990 | Capparese et al. | 380/19 |
| 5,159,631 | 10/1992 | Quan et al. . | |
| 5,278,907 | 1/1994 | Snyder et al. | 380/19 |
| 5,471,531 | 11/1995 | Quan | 380/38 |

FOREIGN PATENT DOCUMENTS

| | | |
|---|---|---|
| 1184608 | 3/1985 | Canada . |
| 61-244144(A) | 10/1986 | Japan . |
| 1-22131(A) | 1/1989 | Japan . |

*Primary Examiner*—Stephen C. Buczinski
*Attorney, Agent, or Firm*—Zarley, McKee, Thomte, Voorhees, & Sease

[57] ABSTRACT

An apparatus and method for creating voice privacy by performing frequency spectrum inversion in electronic voice transmission systems includes the steps of digitizing an analog signal and inverting the frequency spectrum of the digitized audio signal. From the inverted spectrum, a complex signal is created from which the real component is extracted to produce a real signal suitable for transmitting. The digital signal processing is performed entirely with software. The scrambling and descrambling processes are nearly identical, therefore, the same hardware and software may be used to scramble and descramble the signal. The apparatus may uses a "rolling code" to increase the effectiveness of the scrambling.

17 Claims, 4 Drawing Sheets

Scrambled Audio Spectrum
fs = 8 KHz

Arbitrary Complex
Frequency Shift
eg. 1850Hz

Lowpass Filter
fc = 1350Hz

+1650 Hz Complex
Frequency Shift

Real Part Extraction

METHOD AND APPARATUS FOR PERFORMING FREQUENCY SPECTRUM INVERSION

BACKGROUND OF THE INVENTION

A. Field of the Invention

The present invention relates to digital signal processing. More particularly the present invention relates to a method and apparatus for performing frequency spectrum inversion in electronic communications systems.

B. Problems in the Art

In the field of two-way radio communications, it is often desired to have secure communications between the sender and receiver. The most common method of providing security in two-way radio communications is by scrambling the transmitted audio signals and descrambling the received audio signals. Prior art scrambling and descrambling methods have various disadvantages. Most prior art devices involve hardware with excessive complexity and result in poor audio quality after being descrambled. Typical prior art designs use hardware multipliers and analog filters, for example. These designs cause signal loss due to the fixed bandwidth of the analog filter which results in poorer audio quality. Most prior art scrambling and descrambling systems also are inefficient and require a significant amount of hardware to scramble and descramble the audio signals. Prior art systems typically require separate scrambling and descrambling circuits since the scrambling and descrambling processes are different.

Some prior art scrambling and descrambling methods use a "rolling code" to alter the scrambling method over time to reduce the chances of an unauthorized receiver descrambling the signals. Prior art systems using rolling code descramblers are limited in the frequency that the code changes without causing a distortion to the signal. Also, when prior art systems use a rolling code, spectral loss is observed.

Therefore there is room for improvement in the art. The present invention represents an improvement over the state of the art.

C. Features of the Invention

A general feature of the present invention is the provision of a method and apparatus for performing frequency spectrum inversion in electronic communications systems which overcomes problems found in the prior art.

A further feature of the present invention is the provision of a method and apparatus for performing frequency spectrum inversion in electronic communications systems which uses a frequency translation to shift the spectrum of the signal, filters out the complex baseband components, shifts the spectrum again using an arbitrary complex frequency shift, and extracts the real part of the complex signal for transmission.

A further feature of the present invention is the provision of a method and apparatus for performing frequency spectrum inversion in electronic communications systems which eliminates the need for tunable filters and the like by digitizing an audio signal and uses a digital signal processor (DSP) to process the signal.

A further feature of the present invention is the provision of a method and apparatus for performing frequency spectrum inversion in electronic communications systems which creates a scrambled signal which can be efficiently and reliably sent through wireless communication systems or over telephone lines.

A further feature of the present invention is the provision of a method and apparatus for performing frequency spectrum inversion in electronic communications systems which uses software to process the digitized audio signal rather than discrete analog components.

A further feature of the present invention is the provision of a method and apparatus for performing frequency spectrum inversion in electronic communications systems which preserves more of the original audio spectrum than previous methods.

A further feature of the present invention is the provision of a method and apparatus for performing frequency spectrum inversion in electronic communications systems which improves the security of the transmission by allowing for more rapid changing of inversion frequencies than in previous methods.

These as well as other objects, features, and advantages of the present invention will become apparent from the following specification and claims.

SUMMARY OF THE INVENTION

The present invention relates to a method and apparatus for processing digitized audio signals to scramble and descramble audio signals for providing security in electronic communications. The signals are processed by inverting the frequency spectrum of the digitized audio signal. From the inverted spectrum, a complex signal is created from which the real component is extracted to produce a real signal suitable for transmitting. The processing method may optionally include the step of varying the inversion frequency to provide further security.

An apparatus for practicing the method may include an analog to digital converter for sampling and digitizing an audio signal, a processor for processing the digitized audio signal, and a digital to analog converter for converting the digitized processed signal to an analog signal. The scrambling and descrambling processes are identical, therefore, the same hardware and software may be used to scramble and descramble the signal.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Generally, the present invention is a digital signal processing technique by which a sampled audio signal is modified (scrambled) by rearranging its frequency components. In this way, the content of the message of the transmitted signal is preserved, but the message is unintelligible unless processed by a descrambler when received. Audio signals in the frequency range of approximately 300 hertz (Hz) to 3 kilohertz (KHz) are subjected to the process of the present invention in which the frequency spectrum of the signal is inverted. This scrambling process renders the resulting audio signal virtually unintelligible. The scrambled signal can then be sent through wireless systems or over telephone lines with the content of the message protected. When the scrambled signal is received by the receiver the signal is subjected to the descrambling process to recover the original audio signal.

Real signals have a property of symmetry in the frequency spectrum. Since the scrambling process desires a non-symmetrical spectrum, complex signals must be used. For real time varying signals a(t) and b(t), a complex signal is constructed as c(t)=a(t)+jb(t) where j=sqrt(−1), a(t)=real part; jb(t)=imaginary part. A(t) and b(t) can be physically processed as two real signals using complex operational rules. When a(t)=cosωt and b(t)=sinωt then c(t)=cosωt+jsinωt=$e^{j\omega t}$.

Briefly, the digital signal processing technique used by the present invention begins with the analog voice signal being sampled and digitized using a conventional analog to digital converter. The sampled audio signal is then subjected to a positive complex frequency translation that centers the negative frequency components of the desired audio signal around 0 Hz. After the frequency shift, the audio signal is subjected to a low pass filter so that only the baseband components remain. The filtered complex baseband signal is then subjected to an arbitrary complex frequency shift to center the signal frequency in a desired frequency band. The resulting signal spectrum occupies roughly the same bandwidth as the original signal but the frequency spectrum of the signal has been inverted. The final audio signal is produced by extracting the real part of the complex samples. These samples are then processed in a digital to analog converter to generate an analog waveform. This waveform is a distorted version of the input audio signal and the message content is essentially unintelligible. The scrambled signal can be recovered or descrambled with minimal distortion by applying the described process a second time while reversing the order of the frequency shifts.

Figure 1:
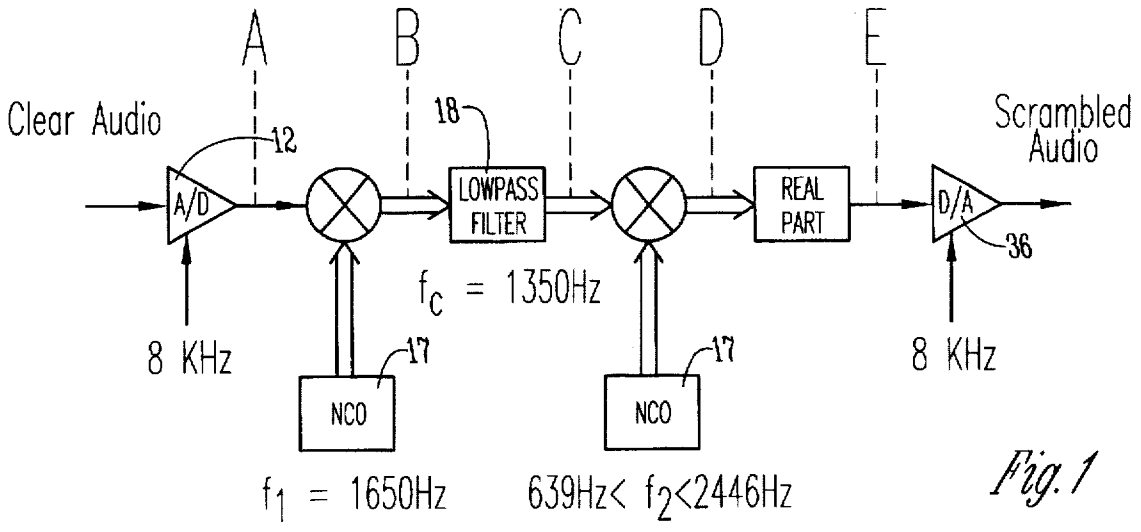
FIG. 1 is a block diagram of the frequency inversion scrambling.

FIG. 1 shows a block diagram illustrating the scrambling process by which the audio spectrum is inverted. The present invention performs the inversion entirely with software.

Figure 2:
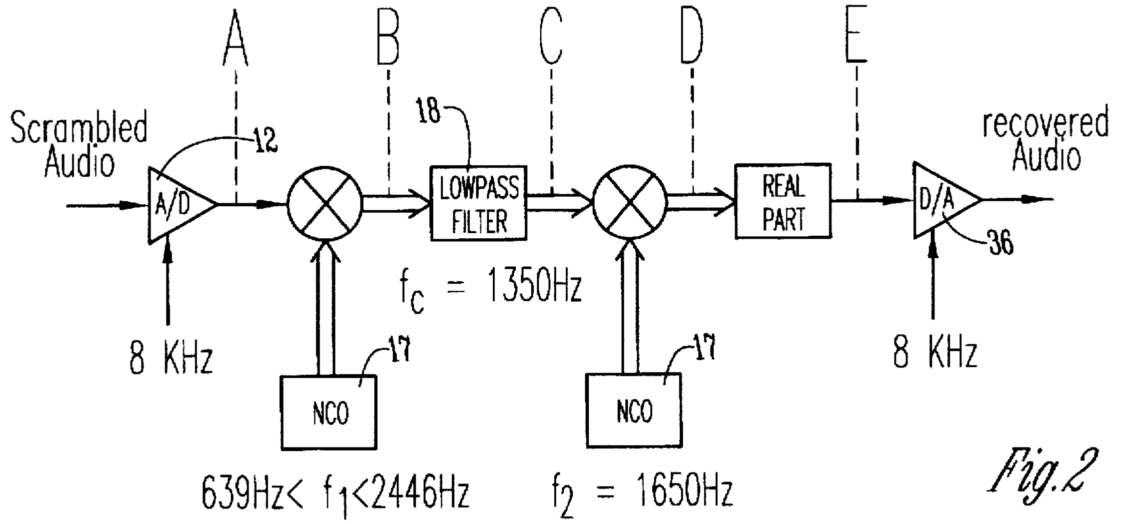
FIG. 2 is a block diagram of the frequency inversion descrambling.

FIG. 2 shows a block diagram illustrating the descrambling process by which the audio spectrum is inverted back to its original spectrum. The present invention also performs the descrambling process entirely with software.

Figure 3:
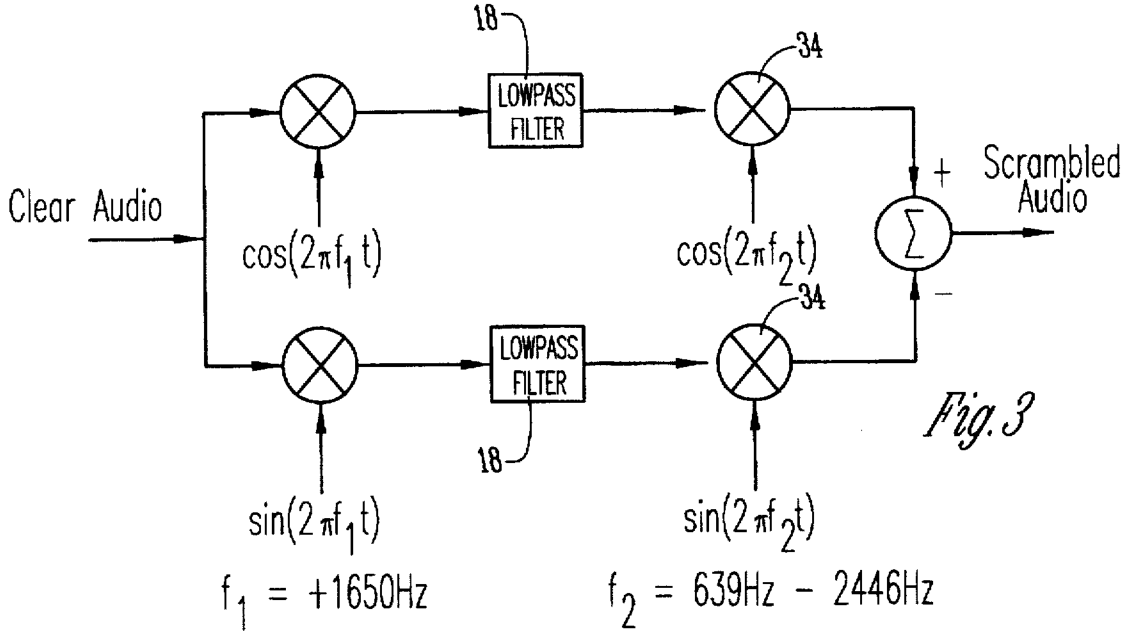
FIG. 3 is a flow chart showing the process by which the frequency spectrum is inverted during the scrambling process.
Figure 4:
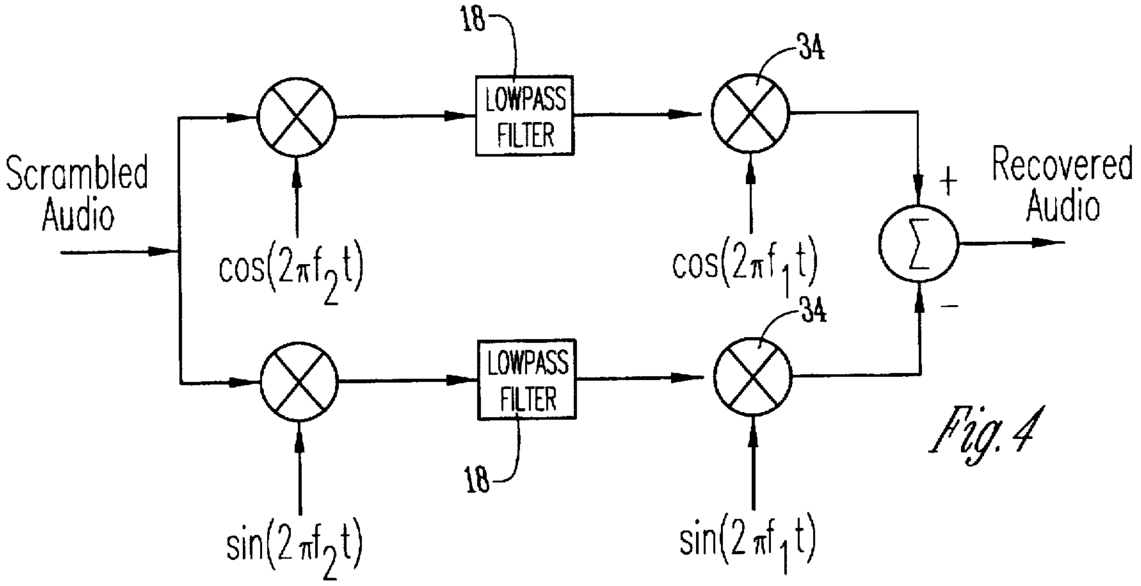
FIG. 4 is a flow chart showing the process by which the frequency spectrum is inverted during the descrambling process.

FIGS. 3 and 4 show more detailed block diagrams of the processes shown in FIGS. 1 and 2. FIGS. 3 and 4 show the method used to implement the process in a DSP chip. The symbols and descriptions in FIGS. 3 and 4 indicate to one skilled in the art the functions that the software of the present invention performs.

FIGS. 6A–6E and 7A–7E are a sequence of diagrams illustrating the resulting signal spectrums at various stages the scrambling and descrambling process shown in FIGS. 1 and 2. The letters A, B, C, D, and E shown in FIG. 1 correspond to the FIGS. 6A, 6B, 6C, 6D, and 6E, respectively, which each show the frequency spectrum of the signal at the stage of the process shown in FIG. 1. Likewise, the letters A, B, C, D, and E shown in FIG. 2 correspond to the FIGS. 7A, 7B, 7C, 7D, and 7E, respectively, which also each show the frequency spectrum of the signal at the stage of the process shown in FIG. 2. FIGS. 6A–6E differ from FIGS. 7A–7E because different signals are introduced at step A and the inversion frequencies are switched around. FIGS. 6 and 7 show a detailed example of the scrambling and descrambling process for an inversion frequency of 3500 Hz using the relation:

$$f_{inv}=f_1+f_2=1650+1850=3500$$

$f_1$ is fixed at 1650 Hz, while $f_2$ can range from 639 Hz to 2446 Hz.

Figure 6A:
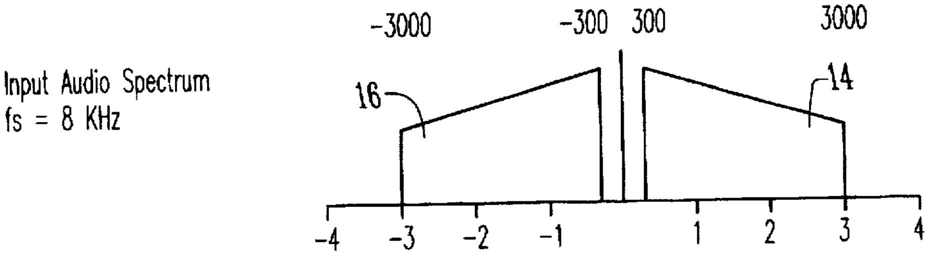
FIGS. 6A–6E show a sequence of diagrams illustrating the resulting signal spectrums at various stages of the scrambling process of the present invention.
Figure 6B:
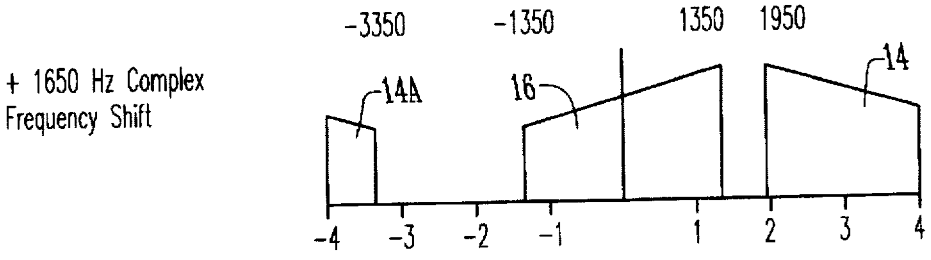

At the beginning of the process, the audio signal is sampled at an 8 KHz rate and digitized using the analog to digital converter 12 shown in FIG. 1. The resulting signal spectrum is shown in FIG. 6A. The resulting spectrum includes an upper sideband 14 and a lower sideband 16. The digitized signal is then multiplied by a complex tone with a fixed frequency of 1650 Hz. This positions the negative frequency components 16 of the original signal from −1350 Hz to 1350 Hz and the positive components 14 are positioned from 1950 Hz to 4000 Hz with some aliasing 14A in to the negative frequencies. A complex tone is represented by $e^{+j\omega t}$=cosωt+jsinωt. This complex tone comes from a numerically controlled oscillator (NCO) 17 shown in FIGS. 1 and 2 and discussed in detail below. The resulting signal spectrum is shown in FIG. 6B. This translates the lower sideband 16 (negative frequencies) of the audio signal (−3 KHz to −300 Hz) to DC as discussed above creating a complex baseband signal. The upper sideband 14 and 14A is an unwanted term and needs to be removed by filtering.

Figure 6C:
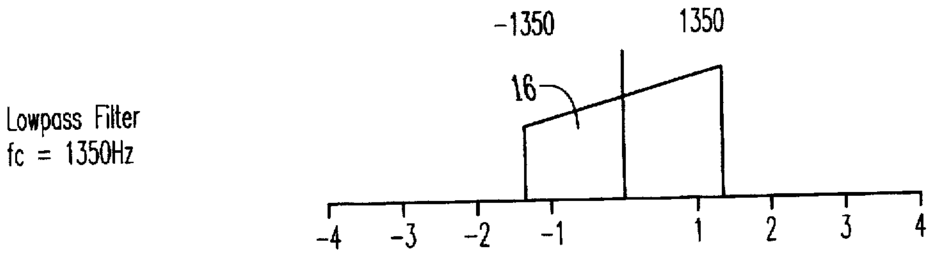

By implementing a low pass filter 18 with a bandwidth of 1350 Hz, the undesired sideband and any components from the desired sideband that are above ±1350 Hz can be suppressed. As shown in FIGS. 1 and 2, a low pass filter 18 is used. The resulting signal spectrum is shown in FIG. 6C. As shown in FIG. 6C, the signal coming out of the low pass filter 18 contains only the desired sideband 16.

Figure 6D:
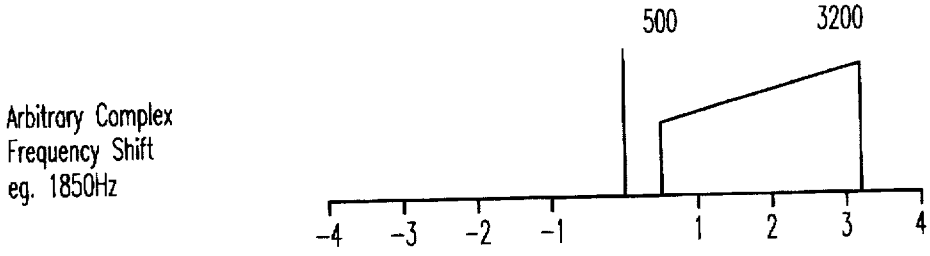
Figure 6E:
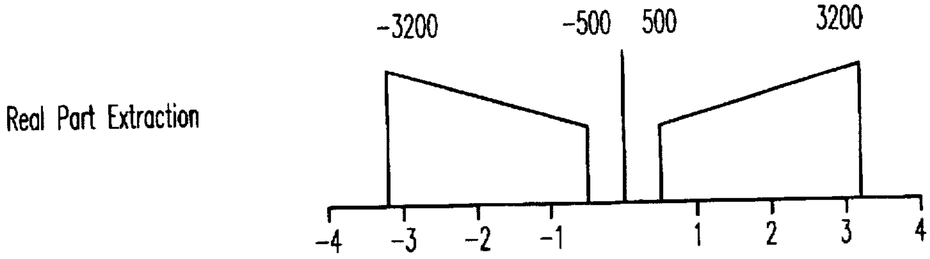
Figure 7A:
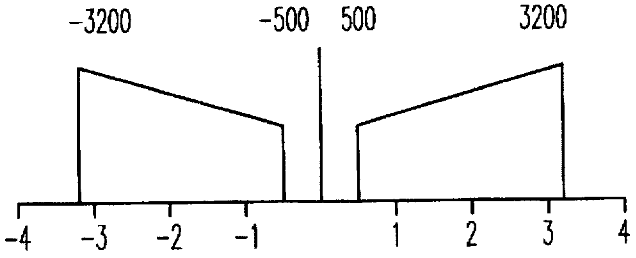
FIGS. 7A–7E show a sequence of diagrams illustrating the resulting signal spectrums at various stages of the descrambling process of the present invention.
Figure 7B:
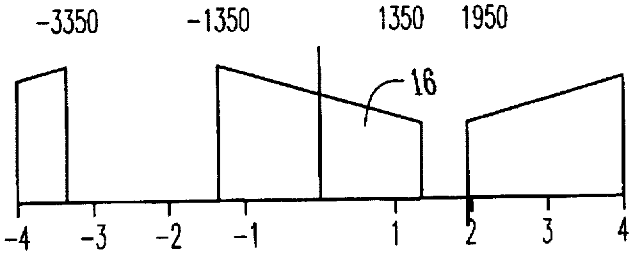
Figure 7C:
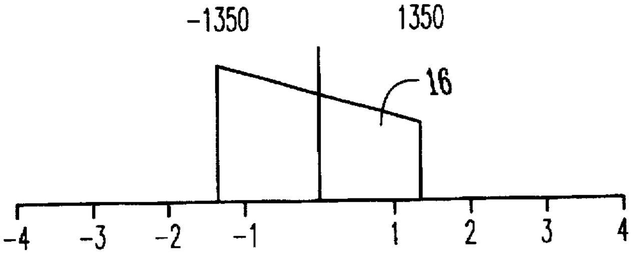
Figure 7D:
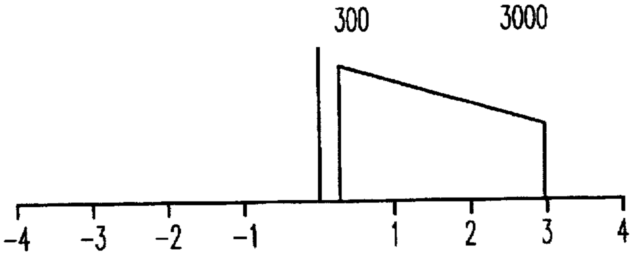
Figure 7E:
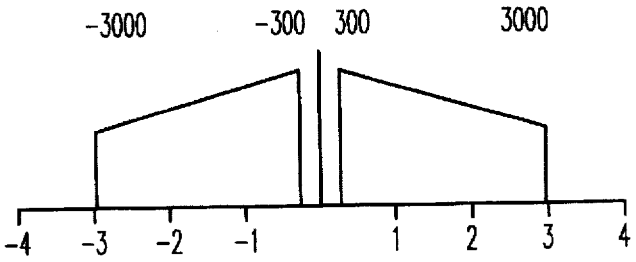

The final step in the process is to apply an arbitrary complex frequency shift. The example shown in FIG. 6D. uses a frequency of 1850 Hz, although other frequencies are also used. This is accomplished with mixer 34 and NCO 17. The resulting signal spectrum is shown in FIG. 6D. This step shifts the inverted spectrum to the 500 Hz to 3200 Hz band. At this point the signal is still complex since its frequency spectrum is single sided, i.e., there is no complimentary frequency components in the negative frequency band. To produce a real signal (having complimentary frequency components in the positive and negative frequency bands) which is required for transmission, the real component of the complex signal is extracted and the imaginary component is discarded. The resulting signal spectrum is shown in FIG. 6E. The resulting signal has a spectrum that corresponds to an in-place inversion of the original audio spectrum which is shown in FIG. 6A.

These processing steps must be performed on sampled data. Preferably, the processing is performed with software although an ASIC (Application-Specific Integrated Circuit) or FPGA could be used to perform the required operations. The preferred embodiment uses a Digital Signal Processor (DSP) part number TMS320C50. This DSP provides adequate resources and functionality in a lost cost, low part count chip set. Assembly programming language is used for efficiency, although other languages could be used.

The resulting digitized real signal can then be converted to an analog signal by digital to analog converter 36 shown in FIGS. 1 and 2. The analog signal can then be transmitted by a wireless system or over a phone line, for example. The scrambled audio signal can then be received by a receiver and descrambled.

The scrambling/descrambling algorithm described above is symmetric except for switching the inversion frequencies. In other words, the scrambling and descrambling algorithms use nearly identical processing. FIGS. 7A through 7E show the corresponding spectrums for the descrambling of the signal scrambled in FIGS. 6A–6E.

Since real filters are not perfect, with real filters there is necessarily a transition band between the passband (the frequency band passed by the filter) and the stopband (the frequency stopped by the filter) of the frequency spectrum. Finite Impulse Response (FIR) filters are used as filter 18 of the present invention because of the necessity of avoiding phase distortion in the recovered audio signal. A practical FIR filter can be used since there is an allowable transition band of 600 Hz to work with.

The lowpass filter 18 can be efficiently realized by using a Third Band Polyphase Filter. A Third Band Filter is a special type of filter that has two important properties. First, its bandwidth is equal to ⅓ the available bandwidth as determined by the sample rate (1333.3 Hz for an 8 KHz sample rate). Second, when implemented as an FIR filter, every third coefficient (counting from the center peak value) is identically zero. This reduces the required computations by 33%. The term polyphase refers to a specific multi-rate implementation of an FIR filter that can be used when making sampling rate changes. For a factor of N sample rate change, the polyphase implementation saves a factor of N in computations.

Figure 5:
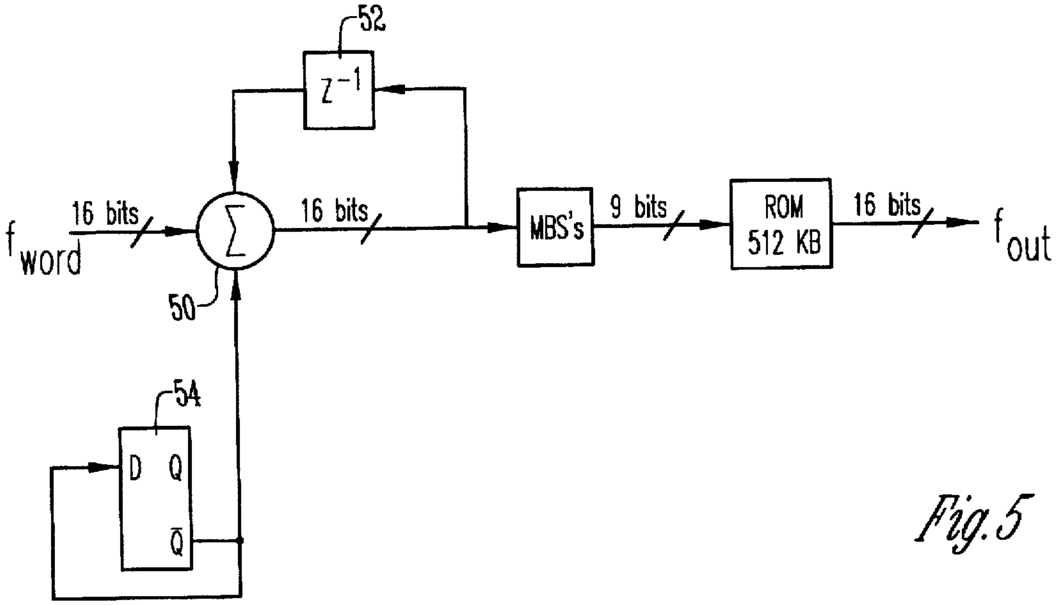
FIG. 5 is a block diagram of the numerically controlled oscillator structure shown in FIGS. 1 and 2.

The NCOs 17 used to perform the frequency translations in the present invention are identical, with the exception that the NCO 17 used to do the arbitrary frequency shift must necessarily have a variable input for its frequency word. A block diagram of the NCO structure is shown in FIG. 5. The NCOs 17 are realized using a phase accumulator 50 that repeatedly adds an input frequency word, a value in an N-bit register 52, and one output of flip flop 54. The value in the register 52 accumulates and overflows continually, at a rate that depends on the input frequency word value and the bit width of the register. The most significant bits (MSB) of the number in the register are used to address a block of memory that contains sample values from a sinusoidal waveform. By varying the frequency word input, a range of frequencies can be assigned to the synthesized output waveform that results.

The variables allowed in the implementation are the bit widths of the phase accumulator, the address and the data value. Since a digital signal processing (DSP) chip is used, it is logical to select the bit width of the data value to equal the bit width of the processor, usually 16 bits. This will yield a quantization noise floor of –98 dBc. The number of address bits depends on the spurious signal to noise ratio (SNR) required in the synthesized sinusoid. Ten bits of address will yield maximum spur levels in the synthesized output of –60 dBc and requires 1024 words of memory. Actually, since all the values for a sinewave can be determined from the first 90 degrees of the waveform, only ¼ of a sinewave need be stored, which would require only 256 words of memory. For phases of the sinewave beyond 90 degrees, the values in memory are either addressed in reverse order, negated or both in order to produce the entire sinewave. The number of bits in the accumulator is determined by the required frequency accuracy. A 16 bit phase accumulator will yield a residual frequency error in the synthesized output of 0.366 Hz, which is adequate.

The present invention operates as follows. A user of a communication system, will utilize the present invention to provide voice privacy by performing frequency spectrum inversion. If the invention is utilized by installation in a communication system, scrambling and descrambling is automatic. The system is installed by placing the system between the transceiver and the microphone or speaker such that before a signal is transmitted by the system it is processed (scrambled) and after a signal is received by the system it is processed (unscrambled). The user of transceiver has control of the device to enable or disable scrambled communications as desired by a button or keypad combination. The process operates as follows. First, an audio message is sampled and digitized by the A/D converter 12. The digitized audio signal then goes through the scrambling process described in detail above. The scrambled signal is converted to an analog audio signal and transmitted. Another user having a receiver receives the scrambled analog audio signal. First, the analog signal is digitized by the A/D converter 12. The digitized signal is then descrambled using the process described in detail above. The unscrambled signal is then converted to an analog signal and used by the second user. The second user can transmit a signal to the first user in the same manner. In doing so, the same process may be used to scramble and descramble the signals. Security of the system can be enhanced by making the arbitrary complex frequency shift vary with time (i.e. a "rolling code"). Using a rolling code requires that the receiver and transmitter be synchronized for proper signal recovery. An example of a rolling code which could be used with the present invention is a linear frequency sweep between −1333 Hz and +1333 Hz using a triangular waveform at a fixed frequency. The scrambling method of the present invention may be used as the sole scrambling method of a communications system or may be used with other systems such as a spectral rotation system.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or rendered expedient without departing from the spirit and scope of the invention as further defined in the following claims.

What is claimed is:

1. A method of processing a digitized audio signal having upper and lower sidebands comprising the steps of:
   - inverting the frequency spectrum of at least one of the sidebands of the digitized audio signal;
   - constructing a complex signal having real and imaginary components and a single sided frequency spectrum based on the inverted frequency spectrum; and
   - extracting the real component of the complex signal to produce a real signal.

2. The method of claim 1 wherein the step of inverting the frequency spectrum further comprises the step of frequency shifting the signal to shift the lower sideband of the signal to the upper sideband.

3. The method of claim 1 wherein the step of inverting the frequency spectrum further comprises the steps of:
   - applying a frequency shift to the signal to center the lower sideband of the signal about a frequency near zero;

filtering out the upper sideband of the signal; and applying a second frequency shift to construct the complex signal.

4. The method of claim 3 wherein the second frequency shift is variable.

5. The method of claim 3 wherein the second frequency shift is varied over time to create a rolling code.

6. The method of claim 3 further comprising the step of converting the real signal to an analog signal.

7. The method of claim 6 further comprising the step of transmitting the analog signal.

8. A method for creating voice privacy in electronic voice transmission systems comprising the steps of:

(a) scrambling a voiced audio message by;

(a1) digitizing an analog representation of the message, (a2) inverting the spectrum of the digitized representation of the message, wherein the digitized representation of the scrambled audio message has real and imaginary parts and is inverted by:

(a2.1) translating the lower sideband of the digitized audio signal to create a complex baseband signal;

(a2.2) filtering out the upper sideband;

frequency shifting the complex baseband signal; and (a2.3) extracting the real part of the signal to produce a real signal (b) creating a scrambled audio message based on the inverted spectral representation of the message; and (c) transmitting the scrambled audio message.

9. The method of claim 8 wherein the steps of inverting the spectrum of the digitized representation of the message is performed with software.

10. The method of claim 8 further comprising the steps of:

receiving the scrambled audio message;

descrambling the scrambled audio message by creating a digitized analog representation of the scrambled audio message, inverting the spectrum of the digitized analog representation of the scrambled audio message, and creating an unscrambled audio message based on the inverted spectral representation of the scrambled audio message.

11. The method of claim 8 wherein the digitized analog representation of the message is inverted by frequency shifting the lower sideband of the digitized analog representation of the message to 0 Hz while filtering out the upper sideband of the of the digitized analog representation of the message.

12. The method of claim 11 further comprising the step of frequency shifting the lower sideband of the digitized analog representation of the message a second time after the filtering to move the remaining signal spectrum to the upper sideband.

13. The method of claim 12 wherein the digitized analog representation has real and imaginary portions, and further comprising the step of extracting the real portion of the digitized analog representation.

14. A method of scrambling and descrambling an audio signal comprising the steps of:

(a) converting an analog audio signal to a digitized audio signal having real and imaginary parts, and upper and lower sideband components;

(b) frequency shifting the digitized audio signal such that the lower sideband components are centered to create a complex baseband signal;

(c) filtering out the upper sideband components of the digitized audio signal;

(d) shifting the filtered complex baseband signal such that the filtered complex baseband signal is centered at a desired frequency in the upper sideband;

(e) extracting the real part of the signal to produce a real signal;

(f) converting the real signal to an analog scrambled audio signal;

(g) repeating steps (a) through (e) with the scrambled analog audio signal; and (h) converting the real signal to an analog descrambled audio signal.

15. The method of claim 14 further comprising the steps of (f1) and (f2) performed after step (f), where steps (f1) and (f2) are:

(f1) transmitting the analog scrambled audio signal; and (f2) receiving the transmitted analog scrambled audio signal.

16. An apparatus for processing an audio signal comprising:

(a) an analog to digital converter for sampling and digitizing an audio signal;

(b) a processor connected to the analog to digital converter, said processor performing the processing steps of inverting the digitized audio signal;

(c) the processor performing the processing steps of inverting the digitized audio signal having real and imaginary components by:

(c1) shifting the digitized signal to center the negative frequency components of the frequency spectrum of the digitized signal to create a complex baseband signal, (c2) filtering out the upper sideband of the complex baseband signal, (c3) shifting the complex baseband signal to the upper sideband to center the complex baseband signal in a desired positive frequency band, and (c4) extracting the real part of the signal to produce a real audio signal; and (d) a digital to analog converter connected to the processor to convert the digitized audio signal to an analog signal.

17. The apparatus of claim 16 further comprising a transmitter connected to the processor to transmit the analog signal.

* * * * *

UNITED STATES PATENT AND TRADEMARK OFFICE
CERTIFICATE OF CORRECTION

PATENT NO. : 5,796,838
DATED : August 18, 1998
INVENTOR(S) : DOUGLAS A. HEERMANN It is certified that error appears in the above-identified patent and that said Letters Patent is hereby corrected as shown below:

Title page item [19], delete "Heerman" and substitute --Heermann--

Title page item [75], delete "Heerman" and substitute --Heermann--

Signed and Sealed this

Eighth Day of December, 1998

Attest:

BRUCE LEHMAN

*Attesting Officer*

*Commissioner of Patents and Trademarks*